(12) United States Patent
Wang

(10) Patent No.: US 10,986,598 B2
(45) Date of Patent: *Apr. 20, 2021

(54) SYNCHRONIZATION SIGNAL CARRYING METHOD AND USER EQUIPMENT

(71) Applicant: Huawei Device Co., Ltd., Guangdong (CN)

(72) Inventor: Jian Wang, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,696

(22) Filed: Dec. 26, 2019

(65) Prior Publication Data

US 2020/0137706 A1  Apr. 30, 2020

Related U.S. Application Data

(63) Continuation of application No. 14/901,977, filed as application No. PCT/CN2014/081932 on Jul. 10, 2014, now Pat. No. 10,548,105.

(30) Foreign Application Priority Data

Jul. 26, 2013 (WO) ................ PCT/CN2013/080228

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0014* (2013.01); *H04L 5/0048* (2013.01);
(Continued)

(58) Field of Classification Search
None
See application file for complete search history.

(56) References Cited

U.S. PATENT DOCUMENTS 5,878,095 A  3/1999 Kainulainen
7,961,698 B2  6/2011 Wu et al.
(Continued)

FOREIGN PATENT DOCUMENTS

CN  1507227 A  6/2004
CN  1956431 A  5/2007
(Continued)

OTHER PUBLICATIONS

U.S. Appl. No. 61/820,021, Wang, filed May 6, 2013 (Year: 2013).*
(Continued)

*Primary Examiner* — Jay L Vogel
(74) *Attorney, Agent, or Firm* — Leydig, Voit & Mayer, Ltd.

(57) ABSTRACT

Embodiments of the present invention provide a synchronization signal carrying method and an apparatus. The synchronization signal carrying method in the present invention includes: determining, by first user equipment, a priority parameter of a synchronization signal; determining, by the first user equipment according to the priority parameter, a resource for carrying the synchronization signal, where a configuration of the resource indicates the priority parameter; and sending, by the first user equipment, the synchronization signal to second user equipment by using the resource, so that the second user equipment determines a synchronization signal for the second user equipment. The embodiments of the present invention enable a more flexible synchronization signal determining manner in a D2D communications system.

6 Claims, 7 Drawing Sheets

(51) Int. Cl.
  *H04W 72/04* (2009.01)
  *H04W 72/10* (2009.01)
  *H04W 76/14* (2018.01)
  *H04W 84/04* (2009.01)

(52) U.S. Cl.
  CPC .......... *H04L 5/0053* (2013.01); *H04L 5/0064* (2013.01); *H04L 5/0094* (2013.01); *H04W 72/0446* (2013.01); *H04W 72/0453* (2013.01); *H04W 72/0466* (2013.01); *H04W 72/10* (2013.01); *H04W 76/14* (2018.02); *H04W 84/042* (2013.01)

(56) References Cited

U.S. PATENT DOCUMENTS

| | | | |
|---|---|---|---|
| 10,548,105 B2* | 1/2020 | Wang | H04W 56/0015 |
| 2009/0323565 A1 | 12/2009 | Funakubo et al. | |
| 2010/0167743 A1 | 7/2010 | Palanki et al. | |
| 2011/0225200 A1 | 9/2011 | Danis et al. | |
| 2011/0287792 A1 | 11/2011 | Zhang et al. | |
| 2011/0312331 A1 | 12/2011 | Hakola et al. | |
| 2013/0077512 A1 | 3/2013 | Chang et al. | |
| 2013/0107897 A1 | 5/2013 | Bui et al. | |
| 2013/0114491 A1 | 5/2013 | Kim et al. | |
| 2014/0029602 A1* | 1/2014 | Han | H04L 25/0226 370/350 |
| 2014/0153390 A1 | 6/2014 | Ishii et al. | |
| 2014/0286293 A1 | 9/2014 | Jang et al. | |
| 2014/0321377 A1 | 10/2014 | Ryu et al. | |
| 2014/0321452 A1 | 10/2014 | Choi et al. | |
| 2015/0195824 A1 | 7/2015 | Choi et al. | |
| 2015/0215763 A1* | 7/2015 | Ro | H04W 8/005 455/426.1 |
| 2015/0319724 A1 | 11/2015 | Chae et al. | |
| 2016/0037466 A1* | 2/2016 | Yang | H04W 36/245 370/350 |

FOREIGN PATENT DOCUMENTS

| | | |
|---|---|---|
| CN | 101145864 A | 3/2008 |
| CN | 101145964 A | 3/2008 |
| CN | 103026645 A | 4/2013 |
| EP | 3002980 A1 | 4/2016 |
| JP | 2013512623 A | 4/2013 |
| JP | 2013529416 A | 7/2013 |
| WO | 2008107995 A1 | 9/2008 |
| WO | 2011130630 A1 | 10/2011 |
| WO | 2013077684 A1 | 5/2013 |
| WO | 2013081393 A1 | 6/2013 |
| WO | 2015003396 A1 | 1/2015 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)," 3GPP TS 36.211, V11.3.0, pp. 1-108, 3rd Generation Partnership Project, Valbonne, France (Jun. 2013).

"3rd Generation Partnership Project; Technical Specification Group Radio Access Network; Evolved Universal Terrestrial Radio Access (E-UTRA); Multiplexing and channel coding (Release 11)," 3GPP TS 36.212, V11.3.0, pp. 1-84, 3rd Generation Partnership Project, Valbonne, France (Jun. 2013).

"3rd Generation Partnership Project; Technical Specification Group Radio Access Network; Evolved Universal Terrestrial Radio Access (E-UTRA); Physical layer procedures (Release 11)," 3GPP TS 36.213, V11.3.0, pp. 1-176, 3rd Generation Partnership Project, Valbonne, France (Jun. 2013).

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.4.0, pp. 1-346, 3rd Generation Partnership Project, Valbonne, France (Jun. 2013).

"D2D for LTE Proximity Services: Overview," 3GPP TSG-RAN WG1 #73, Fukuoka, Japan, R1-132028, 3rd Generation Partnership Project, Valbonne, France (May 20-24, 2013).

"D2D synchronization for out of coverage and partial network coverage," 3GPP TSG-RAN WG1 #74bis, R1-134624, Guangzhou, China, 3rd Generation Partnership Project, Valbonne, France (Oct. 7-11, 2013).

U.S. Appl. No. 61/823,931 to Chae, filed May 16, 2013.

* cited by examiner

SYNCHRONIZATION SIGNAL CARRYING METHOD AND USER EQUIPMENT

CROSS-REFERENCE TO RELATED APPLICATIONS

This application is a continuation of U.S. patent application Ser. No. 14/901,977, filed on Dec. 29, 2015, which is a national stage of International Application No. PCT/CN2014/081932, filed on Jul. 10, 2014. The International Application claims priority to International Application No. PCT/CN2013/080228, filed on Jul. 26, 2013. All of the aforementioned patent applications are hereby incorporated by reference in their entireties.

TECHNICAL FIELD

Embodiments of the present invention relate to the field of communications technologies, and in particular, to a synchronization signal carrying method and user equipment.

BACKGROUND

The device-to-device proximity service (D2D ProSe) has become a research topic of the Long Term Evolution (LTE) system Rel.12 of the 3rd Generation Partnership Project (3GPP). The D2D ProSe provided by using an LTE physical layer can not only expand a service scope of the LTE system but also enable the D2D ProSe to be used by more users. The ProSe includes D2D discovery and D2D communication. D2D discovery refers to that user equipment with D2D function discovers a signal and learns of existence of another user equipment, and D2D communication refers to direct communication between devices with D2D functions. Time synchronization (including frame synchronization, bit synchronization, sampling point synchronization, and the like) and frequency synchronization of the system are two major issues during design of D2D communication. Only after obtaining precise synchronization can a receiving device ensure that subsequent communication functions such as channel estimation, demodulation, and decoding work properly.

In the prior art, synchronization of a D2D communications system is as follows: A transmit end sends a synchronization sequence, and a receive end acquires system synchronization by performing a time synchronization algorithm and a frequency synchronization algorithm on the synchronization sequence. When the transmit end sends the synchronization sequence, a time reference source is required for calibrating a synchronization signal sent by the transmit end. Synchronization precision of different time reference sources is different, which leads to different precision of synchronization signals sent by the transmit end. As a receiver, user equipment usually determines a synchronization signal according to strength of the synchronization signal. This determining manner is relatively monotonous and lacks flexibility.

SUMMARY

Embodiments of the present invention provide a synchronization signal carrying method and user equipment, so as to improve flexibility of a synchronization signal determining manner during D2D communication.

According to a first aspect, an embodiment of the present invention provides a synchronization signal carrying method, including:

determining, by first user equipment, a priority parameter of a synchronization signal;

determining, by the first user equipment according to the priority parameter, a resource for carrying the synchronization signal, where a configuration of the resource indicates the priority parameter; and sending, by the first user equipment, the synchronization signal to second user equipment by using the resource, so that the second user equipment determines a synchronization signal for the second user equipment.

In a first implementation manner of the first aspect, the determining, by the first user equipment according to the priority parameter, a resource for carrying the synchronization signal specifically includes:

determining, by the first user equipment, different resources to carry synchronization signals with different priority parameters.

With reference to the first implementation manner of the first aspect, in a second implementation manner, the first user equipment determines different resources to carry synchronization signals with different priority parameters.

With reference to the first aspect, the first implementation manner, and the second implementation manner, in a third implementation manner, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the first aspect, the first implementation manner, the second implementation manner, and the third implementation manner, in a fourth implementation manner, the source of the synchronization signal includes: a global satellite positioning system, a network device, or the first user equipment.

With reference to the first aspect, the first implementation manner, the second implementation manner, the third implementation manner, and the fourth implementation manner, in a fifth implementation manner, the resource includes: a time domain resource, a frequency domain resource, and a codeword resource; and the different resources are specifically resources that differ in at least one of a time domain, a frequency domain, and a codeword.

With reference to the first aspect, the first implementation manner, the second implementation manner, the third implementation manner, the fourth implementation manner, and the fifth implementation manner, in a sixth implementation manner, that time domain resources carrying the synchronization signals are different includes at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

With reference to the first aspect, the first implementation manner, the second implementation manner, the third implementation manner, the fourth implementation manner, the fifth implementation manner, and the sixth implementation manner, in a seventh implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the first aspect, the first implementation manner, the second implementation manner, the third implementation manner, the fourth implementation manner, the fifth implementation manner, the sixth implementation manner, and the seventh implementation manner, in an eighth implementation manner, the resources that differ in a codeword are specifically resources that differ in a codeword sequence.

With reference to the first aspect, the first implementation manner, the second implementation manner, the third implementation manner, the fourth implementation manner, the fifth implementation manner, the sixth implementation manner, the seventh implementation manner, and the eighth implementation manner, in a ninth implementation manner, the codeword sequence is a sequence with a length of 63 bits:

$$d_u(n) = e^{-j\frac{\pi un(n+1)}{63}} \quad n = 0, 1, \ldots, 30, 31, 32, \ldots, 61, 62,$$

where a value of u is 25, 29, or 34, and three different codeword sequences are generated separately.

According to a second aspect, an embodiment of the present invention further provides a synchronization signal carrying method, including:

receiving, by second user equipment, a synchronization signal sent by first user equipment;

determining, by the second user equipment, a priority parameter according to a resource carrying the synchronization signal and a correspondence between the resource and the priority parameter of the synchronization signal; and determining, by the second user equipment, a synchronization signal for the second user equipment according to the priority parameter.

With reference to the second aspect, in a first implementation manner of the second aspect, synchronization signals with different priority parameters are carried by using different resources.

With reference to the second aspect and the first implementation manner, in a second implementation manner, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the second aspect, the first implementation manner, and the second implementation manner, in a third implementation manner, the source of the synchronization signal includes: a global satellite positioning system, a network device, or the first user equipment.

With reference to the second aspect, the first implementation manner, the second implementation manner, and the third implementation manner, in a fourth implementation manner, the resource includes: a time domain resource, a frequency domain resource, and a codeword resource; and the different resources are specifically resources that differ in at least one of a time domain, a frequency domain, and a codeword.

With reference to the first aspect, the first implementation manner, the second implementation manner, the third implementation manner, and the fourth implementation manner, in a fifth implementation manner, that time domain resources carrying the synchronization signals are different includes at least one of the following: serial numbers of data frames are different; serial numbers of timeslots carrying the synchronization signals are different; serial numbers of subframes carrying the synchronization signals are different; and serial numbers of OFDM symbols carrying the synchronization signals are different.

With reference to the first aspect, the first implementation manner, the second implementation manner, the third implementation manner, the fourth implementation manner, and the fifth implementation manner, in a sixth implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the first aspect, the first implementation manner, the second implementation manner, the third implementation manner, the fourth implementation manner, the fifth implementation manner, and the sixth implementation manner, in a seventh implementation manner, the resources that differ in a codeword are specifically resources that differ in a codeword sequence.

With reference to the first aspect, the first implementation manner, the second implementation manner, the third implementation manner, the fourth implementation manner, the fifth implementation manner, the sixth implementation manner, and the seventh implementation manner, in an eighth implementation manner, the codeword sequence is a sequence with a length of 63 bits:

$$d_u(n) = e^{-j\frac{\pi un(n+1)}{63}} \quad n = 0, 1, \ldots, 30, 31, 32, \ldots, 61, 62,$$

where a value of u is 25, 29, or 34.

According to a third aspect, an embodiment of the present invention further provides user equipment, including:

a parameter determining module, configured to determine a priority parameter of a synchronization signal;

a resource determining module, configured to determine, according to the priority parameter, a resource for carrying the synchronization signal, where a configuration of the resource indicates the priority parameter; and a sending module, configured to send the synchronization signal to second user equipment by using the resource, so that the second user equipment determines a synchronization signal for the second user equipment.

In a first implementation manner of the third aspect, the resource determining module is specifically configured to: determine different resources to carry synchronization signals with different priority parameters.

With reference to the first implementation manner of the third aspect, in a second implementation manner, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the third aspect, the first implementation manner, and the second implementation manner, in a third implementation manner, the source of the synchronization signal includes: a global satellite positioning system, a network device, or the user equipment.

With reference to the third aspect, the first implementation manner, the second implementation manner, and the third implementation manner, in a fourth implementation manner, the resource includes: a time domain resource, a frequency domain resource, and a codeword resource; and the different resources are specifically resources that differ in at least one of a time domain, a frequency domain, and a codeword.

With reference to the third aspect, the first implementation manner, the second implementation manner, the third implementation manner, and the fourth implementation manner, in a fifth implementation manner, that time domain resources carrying the synchronization signals are different includes at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

With reference to the third aspect, the first implementation manner, the second implementation manner, the third implementation manner, the fourth implementation manner, and the fifth implementation manner, in a sixth implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the third aspect, the first implementation manner, the second implementation manner, the third implementation manner, the fourth implementation manner, the fifth implementation manner, and the sixth implementation manner, in a seventh implementation manner, the resources that differ in a codeword are specifically resources that differ in a codeword sequence.

With reference to the third aspect, the first implementation manner, the second implementation manner, the third implementation manner, the fourth implementation manner, the fifth implementation manner, the sixth implementation manner, and the seventh implementation manner, in an eighth implementation manner, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where a value of u is 25, 29, or 34, and three different codeword sequences are generated separately.

According to a fourth aspect, an embodiment of the present invention further provides user equipment, including:

a receiving module, configured to receive a synchronization signal sent by first user equipment; and a determining module, configured to determine a priority parameter according to a resource carrying the synchronization signal and a correspondence between the resource and the priority parameter of the synchronization signal, and determine a synchronization signal for the second user equipment according to the priority parameter.

In a first implementation manner of the fourth aspect, synchronization signals with different priority parameters are carried by using different resources.

With reference to the first implementation manner of the fourth aspect, in a second implementation manner, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the fourth aspect, the first implementation manner, and the second implementation manner, in a third implementation manner, the source of the synchronization signal includes: a global satellite positioning system, a network device, or the first user equipment.

With reference to the fourth aspect, the first implementation manner, the second implementation manner, and the third implementation manner, in a fourth implementation manner, the resource includes: a time domain resource, a frequency domain resource, and a codeword resource; and the different resources are specifically resources that differ in at least one of a time domain, a frequency domain, and a codeword.

With reference to the fourth aspect, the first implementation manner, the second implementation manner, the third implementation manner, and the fourth implementation manner, in a fifth implementation manner, that time domain resources carrying the synchronization signals are different includes at least one of the following: serial numbers of data frames are different; serial numbers of timeslots carrying the synchronization signals are different; serial numbers of subframes carrying the synchronization signals are different; and serial numbers of OFDM symbols carrying the synchronization signals are different.

With reference to the fourth aspect, the first implementation manner, the second implementation manner, the third implementation manner, the fourth implementation manner, and the fifth implementation manner, in a sixth implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the fourth aspect, the first implementation manner, the second implementation manner, the third implementation manner, the fourth implementation manner, the fifth implementation manner, and the sixth implementation manner, in a seventh implementation manner, the resources that differ in a codeword are specifically resources that differ in a codeword sequence.

With reference to the fourth aspect, the first implementation manner, the second implementation manner, the third implementation manner, the fourth implementation manner, the fifth implementation manner, the sixth implementation manner, and the seventh implementation manner, in an eighth implementation manner, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where a value of u is 25, 29, or 34.

According to a fifth aspect, an embodiment of the present invention further provides user equipment, including: a transceiver and a processor, where the processor is configured to determine a priority parameter of a synchronization signal and determine, according to the priority parameter, a resource for carrying the synchronization signal, where a configuration of the resource indicates the priority parameter; and the transceiver is configured to send the synchronization signal to another user equipment by using the resource, so that the another user equipment determines a synchronization signal for the another user equipment.

In a first implementation manner of the fifth aspect, the processor is specifically configured to: determine different resources to carry synchronization signals with different priority parameters.

In the first implementation manner of the fifth aspect, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the fifth aspect, the first implementation manner, and the second implementation manner, in a third implementation manner, the source of the synchronization signal includes: a global satellite positioning system, a network device, or the user equipment.

With reference to the fifth aspect, the first implementation manner, the second implementation manner, and the third implementation manner, in a fourth implementation manner, the resource includes: a time domain resource, a frequency domain resource, and a codeword resource; and the different resources are specifically resources that differ in at least one of a time domain, a frequency domain, and a codeword.

With reference to the fifth aspect, the first implementation manner, the second implementation manner, the third implementation manner, and the fourth implementation manner, in a fifth implementation manner, that time domain resources carrying the synchronization signals are different includes at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

With reference to the fifth aspect, the first implementation manner, the second implementation manner, the third implementation manner, the fourth implementation manner, and the fifth implementation manner, in a sixth implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the fifth aspect, the first implementation manner, the second implementation manner, the third implementation manner, the fourth implementation manner, the fifth implementation manner, and the sixth implementation manner, in a seventh implementation manner, the resources that differ in a codeword are specifically resources that differ in a codeword sequence.

With reference to the fifth aspect, the first implementation manner, the second implementation manner, the third implementation manner, the fourth implementation manner, the fifth implementation manner, the sixth implementation manner, the seventh implementation manner, and an eighth implementation manner, in a ninth implementation manner, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where a value of u is 25, 29, or 34, and three different codeword sequences are generated separately.

According to a sixth aspect, an embodiment of the present invention further provides user equipment, including: a transceiver and a processor, where the transceiver is configured to receive a synchronization signal sent by another user equipment; and the processor is configured to determine a priority parameter according to a resource carrying the synchronization signal and a correspondence between the resource and the priority parameter of the synchronization signal, and determine a synchronization signal for the user equipment according to the priority parameter.

In a first implementation manner of the sixth aspect, synchronization signals with different priority parameters are carried by using different resources.

With reference to the first implementation manner of the sixth aspect, in a second implementation manner, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

With reference to the sixth aspect, the first implementation manner, and the second implementation manner, in a third implementation manner, the source of the synchronization signal includes: a global satellite positioning system, a network device, or the first user equipment.

With reference to the sixth aspect, the first implementation manner, the second implementation manner, and the third implementation manner, in a fourth implementation manner, the resource includes: a time domain resource, a frequency domain resource, and a codeword resource; and the different resources are specifically resources that differ in at least one of a time domain, a frequency domain, and a codeword.

With reference to the sixth aspect, the first implementation manner, the second implementation manner, the third implementation manner, and the fourth implementation manner, in a fifth implementation manner, that time domain resources carrying the synchronization signals are different includes at least one of the following: serial numbers of data frames are different; serial numbers of timeslots carrying the synchronization signals are different; serial numbers of subframes carrying the synchronization signals are different; and serial numbers of OFDM symbols carrying the synchronization signals are different.

With reference to the sixth aspect, the first implementation manner, the second implementation manner, the third implementation manner, the fourth implementation manner, and the fifth implementation manner, in a sixth implementation manner, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

With reference to the sixth aspect, the first implementation manner, the second implementation manner, the third implementation manner, the fourth implementation manner, the fifth implementation manner, and the sixth implementation manner, in a seventh implementation manner, the resources that differ in a codeword are specifically resources that differ in a codeword sequence.

With reference to the sixth aspect, the first implementation manner, the second implementation manner, the third implementation manner, the fourth implementation manner, the fifth implementation manner, the sixth implementation manner, and the seventh implementation manner, in an eighth implementation manner, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where a value of u is 25, 29, or 34.

According to the synchronization signal carrying method and the user equipment that are provided in the embodiments of the present invention, user equipment determines a priority parameter of a synchronization signal, determines, according to the priority parameter, a resource for carrying the synchronization signal, and further sends the synchronization signal by using the determined resource. In this way, user equipment receiving the synchronization signal can identify synchronization signals with different priority parameters according to resources carrying the synchronization signals, and the user equipment receiving the synchronization signal can determine a synchronization signal according to a priority parameter, and therefore, a determining manner is more flexible.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a time division multiple access (TDMA) system, wideband code division multiple access (WCDMA), a frequency division multiple access (FDMA) system, an orthogonal frequency-division multiple access (OFDMA) system, a single-carrier FDMA (SC-FDMA) system, a general packet radio service (GPRS) system, a Long Term Evolution (LTE) system, and other communications systems.

User equipment involved in this application may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core networks by using a wireless radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the wireless access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be called a system, a subscriber unit, a subscriber station, a mobile station, a mobile station, a remote station, an access point, a remote terminal, an access terminal, a user terminal, a user agent, a user device, or user equipment.

A network device involved in the present application may be, for example, a base station, a radio network controller (RNC), or the like.

The base station (for example, an access point) may be a base transceiver station (BTS) in GSM or CDMA, may also be a base station (NodeB) in WCDMA, and may further be an evolved NodeB (NodeB, eNB, or e-NodeB, evolutional Node B) in LTE, which is not limited in this application.

Figure 1:
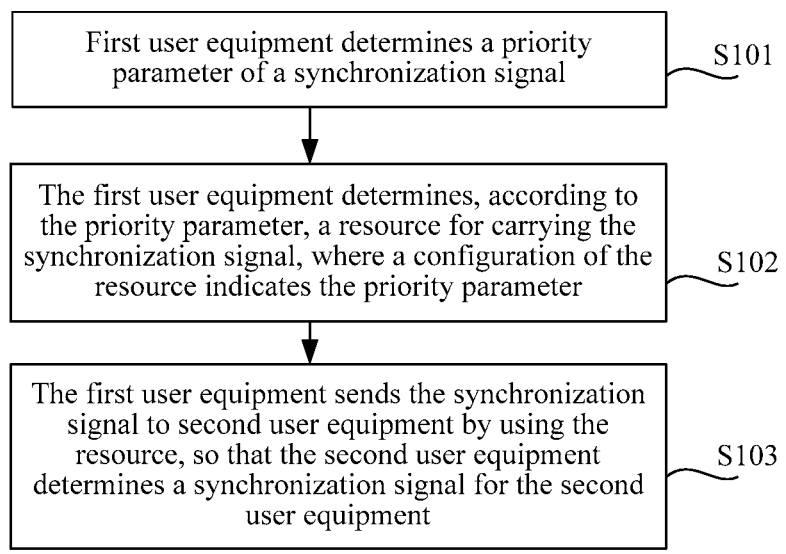
FIG. 1 is a flowchart of an embodiment of a synchronization signal carrying method according to the present invention.

FIG. 1 is a flowchart of an embodiment of a synchronization signal carrying method according to the present invention. As shown in FIG. 1, the method in this embodiment may include:

Step 101. First user equipment determines a priority parameter of a synchronization signal.

Step 102. The first user equipment determines, according to the priority parameter, a resource for carrying the synchronization signal, where a configuration of the resource indicates the priority parameter.

Step 103. The first user equipment sends the synchronization signal to second user equipment by using the resource, so that the second user equipment determines a synchronization signal for the second user equipment.

Optionally, the priority parameter of the synchronization signal may specifically include at least one of a level and a layer.

As a feasible implementation manner, the level of the synchronization signal may be used to identify a source of the synchronization signal, and the source of the synchronization signal may specifically include a global navigation satellite system (GNSS), a network device, such as an eNodeB, or the first user equipment, such as a clock (local timing) of the first user equipment itself. For example, a synchronization signal coming from the GNSS may be considered as being of a first level, a synchronization signal coming from the eNodeB may be considered as being of a second level, and a synchronization signal coming from the local timing may be considered as being of a third level. It may be set that: a priority of the first level is higher than that of the second level, a priority of the second level is higher than that of the third level, and so on.

As another feasible implementation manner, the level of the synchronization signal may further be used to identify precision of the synchronization signal. For example, a synchronization signal with precision less than or equal to 0.1 ppm may be considered as being of a first level; a synchronization signal with precision greater than 0.1 ppm and less than or equal to 0.5 ppm may be considered as being of a second level; and a synchronization signal with precision greater than 0.5 ppm, or less than or equal to 1.0 ppm may be considered as being of a third level; and a synchronization signal with precision greater than 1.0 ppm may be considered as being of a fourth level. It may be set that: a priority of the first level is higher than that of the second level, a priority of the second level is higher than that of the third level, a priority of the third level is higher than that of the fourth level, and so on.

The above merely exemplarily provides a feasible level classification manner, but does not impose limitation on this embodiment of the present invention.

Optionally, the layer of the synchronization signal may be used to identify a forwarding level of the synchronization signal. For example, in the foregoing example in which the first user equipment sends the synchronization signal to the second user equipment, if the synchronization signal is a synchronization signal generated by the first user equipment itself, the synchronization signal may be considered as being of a first layer; if the synchronization signal is generated by the first user equipment according to a synchronization signal generated by a third user equipment, in this case, a synchronization signal sent by the third user equipment to the first user equipment is considered as being of a first layer, and a synchronization signal sent by the first user equipment to the second user equipment is considered as being of a second layer; and so on. It may be set that: a priority of the first layer is higher than that of the second layer, a priority of the second layer is higher than that of the third layer, and so on.

It needs to be noted that synchronization signals with different priority parameters may be specifically synchronization signals that differ in at least one of the level and the layer. That is, the synchronization signals with different priority parameters may be synchronization signals that differ in the level, or may be synchronization signals that differ in the layer, or may be synchronization signals that differ in both the level and the layer.

In this embodiment of the present invention, after determining the priority parameter of the synchronization signal, the first user equipment may determine, according to the different priority parameters of the synchronization signals, different resources for carrying.

The foregoing resource may include a time domain resource, a frequency domain resource, and a codeword resource. The different resources may be specifically resources that differ in at least one of a time domain, a frequency domain, and a codeword.

If all three of a time domain resource, a frequency domain resource, and a codeword resource that carry at least two synchronization signals are completely the same, the at least two synchronization signals may be deemed as same synchronization signals. If the three resources of the foregoing at least two synchronization signals are not completely the same, that is, at least one type of resource is different, the foregoing at least two synchronization signals are deemed as different synchronization signals.

Optionally, that time domain resources carrying the synchronization signals are different may include at least one of the following: serial numbers of data frames carrying the synchronization signals are different; serial numbers of timeslots carrying the synchronization signals are different; serial numbers of subframes carrying the synchronization signals are different; and serial numbers of orthogonal frequency division multiplexing OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different. That serial numbers of subcarriers in a subcarrier group carrying the synchronization signals are different is illustrated by using the following example: if two subcarrier groups separately include three subcarriers, where serial numbers of three subcarriers in one subcarrier group are, for example, 1, 2, and 3 separately, and serial numbers of three subcarriers in another subcarrier group are, for example, 1, 3, and 4 separately, because a serial number of one subcarrier in one subcarrier group is different from a serial number of one subcarrier in the other subcarrier group (2 and 4 are different serial numbers), it is deemed that the serial numbers of the subcarriers in the two subcarrier groups are different. That is, it can be deemed that serial numbers of subcarriers in at least two subcarrier groups are different provided that a serial number of one subcarrier in one of the at least two subcarrier groups is different from a serial number of one subcarrier in another subcarrier group in the at least two subcarrier groups.

Optionally, the resources that differ in a codeword may be specifically resources that differ in a codeword sequence.

After determining the priority parameter of the synchronization signal, the first user equipment may further determine to use which type of resource and which resource configuration manner to carry the synchronization signal, so that second user equipment that receives the synchronization signal can learn of the priority parameter corresponding to the synchronization signal, and determine a synchronization signal for the second user equipment accordingly.

In the synchronization signal carrying method according to this embodiment, user equipment determines a priority parameter of a synchronization signal, determines, according to the priority parameter, a resource for carrying the synchronization signal, and further sends the synchronization signal by using the determined resource. In this way, user equipment receiving the synchronization signal can identify synchronization signals with different priority parameters according to resources carrying the synchronization signals, and the user equipment receiving the synchronization signal can determine a synchronization signal according to a priority parameter, thereby improving flexibility of a synchronization signal determining manner. In addition, because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Figure 2:
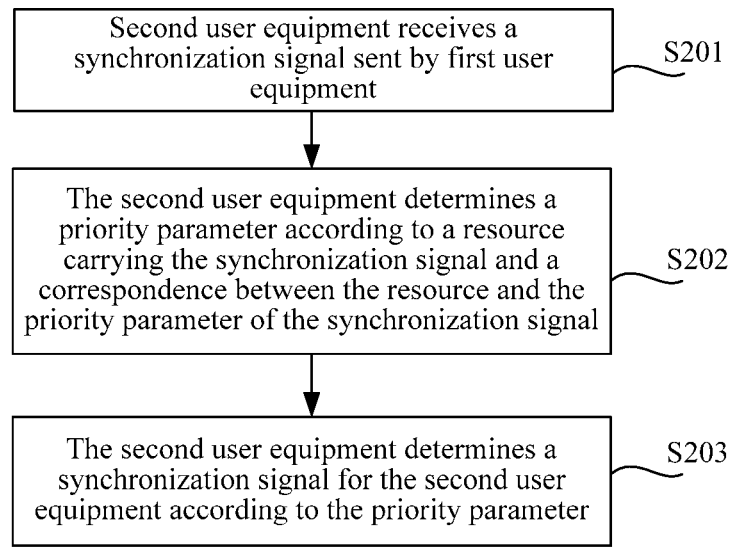
FIG. 2 is a flowchart of an embodiment of a synchronization signal carrying method according to the present invention.

FIG. 2 is a flowchart of still another embodiment of a synchronization signal carrying method according to the present invention. As shown in FIG. 2, the method includes:

S201. Second user equipment receives a synchronization signal sent by first user equipment.

S202. The second user equipment determines a priority parameter according to a resource carrying the synchronization signal and a correspondence between the resource and the priority parameter of the synchronization signal.

S203. The second user equipment determines a synchronization signal for the second user equipment according to the priority parameter.

Synchronization signals with different priority parameters may be carried by using different resources. That is, there is a correspondence between the resource carrying the synchronization signal and the priority parameter of the synchronization signal. Therefore, after receiving the synchronization signal sent by the first user equipment, the second user equipment may determine a priority of the synchronization signal according to the resource carrying the synchronization signal and the correspondence between the resource and the priority parameter of the synchronization signal, where the correspondence may be determined by one or both of the first user equipment and the second user equipment. After the determining, both the first user equipment and the second user equipment can acquire the correspondence. Multiple manners of acquiring or storing the correspondence are available, and this embodiment does not impose limitation on the present invention.

It can be understood that there are multiple manners for the second user equipment to determine a synchronization signal for the second user equipment itself. For example, the second user equipment may select a synchronization signal with a highest priority from all received synchronization signals according to priority parameters of these synchronization signals, as the synchronization signal for the second user equipment itself, or may also use another manner. This embodiment does not impose limitation on the present invention. Optionally, the priority parameter of the synchronization signal may specifically include at least one of a level and a layer.

As a feasible implementation manner, the level of the synchronization signal may be used to identify a source of the synchronization signal, and the source of the synchronization signal may specifically include a GNSS, a network device, or the foregoing first user equipment. It can be understood that for a synchronization signal, there is merely one source, and for all synchronization signals in a communications system, a source of each of the synchronization signals may be any one of the foregoing three sources. The foregoing sources are merely examples and there may further be another source. Specifically, different sources of synchronization signals may be distinguished by a first level, a second level, a third level, and so on. It may be set that: a priority of the first level is higher than that of the second level, a priority of the second level is higher than that of the third level, and so on.

As another feasible implementation manner, the level of the synchronization signal may further be used to identify precision of the synchronization signal. Synchronization signals may be classified into levels according to an order of precision. For example, different sources of synchronization signals are distinguished by classifying the sources into a first level, a second level, a third level, and so on: a synchronization signal with precision less than or equal to 0.1 ppm may be considered as being of the first level; a synchronization signal with precision greater than 0.1 ppm and less than or equal to 0.5 ppm may be considered as being of the second level; a synchronization signal with precision greater than 0.5 ppm, or less than or equal to 1.0 ppm may be considered as being of the third level; a synchronization signal with precision greater than 1.0 ppm may be considered as being of a fourth level. It may be set that: a priority of the first level is higher than that of the second level, a priority of the second level is higher than that of the third level, and so on.

For details about the level of the synchronization signal, reference may be made to related descriptions in the embodiment shown in FIG. 1, and details are not described herein again.

The above merely exemplarily provides a feasible level classification manner, but does not impose limitation on this embodiment of the present invention.

Optionally, the layer of the synchronization signal may be used to identify a forwarding level of the synchronization signal. For example: user equipment A generates a synchronization signal according to a synchronization signal generated by another user equipment B. In this case, the synchronization signal generated by the user equipment A is one layer lower than the synchronization signal generated by the user equipment B. Specifically, different layers may be expressed by using a first layer, a second layer, a third layer, and so on. It may be set that: a priority of the first layer is higher than that of the second layer, a priority of the second layer is higher than that of the third layer, and so on.

For details about the layer of the synchronization signal, reference may be made to related descriptions in the embodiment shown in FIG. 1, and details are not described herein again.

It needs to be noted that synchronization signals with different priority parameters may be specifically synchronization signals that differ in at least one of the level and the layer. That is, the synchronization signals with different priority parameters may be synchronization signals that differ in the level, or may be synchronization signals that differ in the layer, or may be synchronization signals that differ in both the level and the layer.

Optionally, the resource carrying the synchronization signal may include a time domain resource, a frequency domain resource, and a codeword resource. The different resources may be specifically resources that differ in at least one of a time domain, a frequency domain, and a codeword.

If all three of a time domain resource, a frequency domain resource, and a codeword resource that carry at least two synchronization signals are completely the same, the at least two synchronization signals may be deemed as same synchronization signals. If the three resources of the foregoing at least two synchronization signals are not completely the same, that is, at least one type of resource is different, the foregoing at least two synchronization signals are deemed as different synchronization signals.

Optionally, that time domain resources carrying the synchronization signals are different may include at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

Optionally, the resources that differ in a codeword may be specifically resources that differ in a codeword sequence.

In a communications system, a correspondence between the resource and the priority parameter of the synchronization signal may be preset. Each user equipment in the communications system may learn of the foregoing correspondence in advance, and then, after receiving the synchronization signal, the second user equipment can determine a priority of the synchronization signal according to the resource carrying the synchronization signal and the correspondence.

Further, after determining the priority parameter corresponding to the synchronization signal, the second user equipment determines a synchronization signal for the second user equipment accordingly. Optionally, if the second user equipment generates a synchronization signal according to the synchronization signal sent by the first user equipment, a level of the synchronization signal generated by the second user equipment may be the same as a level of the synchronization signal of the first user equipment, and a layer of the synchronization signal generated by the second user equipment is one layer lower than that of the synchronization signal of the first user equipment.

In the synchronization signal carrying method according to this embodiment of the present invention, after receiving a synchronization signal sent by another user equipment, user equipment determines a priority parameter of the synchronization signal according to a resource carrying the synchronization signal and a correspondence between the resource and the priority parameter of the synchronization signal, and determines a synchronization signal for the user equipment itself according to the priority parameter, thereby improving flexibility of a synchronization signal determining manner. In addition, because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

The following uses specific embodiments to describe in detail the technical solutions of the method embodiments shown in FIG. 1 and FIG. 2.

In an embodiment of a synchronization signal carrying method provided in the present invention, synchronization signals with different priority parameters may be distinguished by using different time domain resources.

Herein, a time domain resource for sending a synchronization signal may be a data frames, a subframe, a timeslots, or an orthogonal frequency division multiplexing OFDM symbol, for sending a synchronization signal. Distinguishing between synchronization signals with different priority parameters according to different time domain resources may be distinguishing between signals and the synchronization signals with different priority parameters by sending the synchronization signals in data frames with different serial numbers, subframes with different serial numbers, timeslots with different serial numbers, OFDM symbols with different serial numbers, or any combination of the foregoing four resources.

The following uses an example in which synchronization signals with different priority parameters are distinguished by using different subframes with different serial numbers. It can be understood that the example may be extended to that synchronization signals with different priority parameters are distinguished by using data frames, timeslots, or OFDM symbols.

Figure 3:
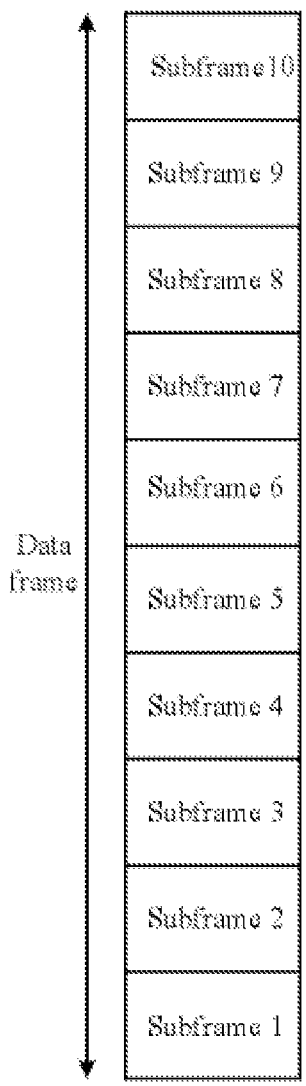
FIG. 3 is a schematic diagram of a configuration of a time domain resource in still another embodiment of a synchronization signal carrying method according to the present invention.

As shown in FIG. 3, it is assumed that one data frame includes 10 subframes, and serial numbers of the 10 subframes are 1, 2, 3, 4, 5, 6, 7, 8, 9, and 10 separately. One data frame may carry one or more synchronization sequences and the one or more synchronization sequences are used to carry a same synchronization signal. Generally, one data frame may carry two synchronization sequences, and the two synchronization sequences are used to carry a same synchronization signal. The following is described by using an example in which one data frame carries two synchronization sequences. It is assumed that a first synchronization sequence of the synchronization signal is carried on the first subframe. In this implementation scenario, different synchronization signals are distinguished by the following several types of subframe configurations: {1, 2}, {1, 3}, {1, 4}, and {1, 5}, where {1, 2} expresses that one synchronization sequence is carried on the first subframe (that is, a serial number of the subframe in the data frames is 1) and the other synchronization sequence is carried on the second subframe (that is, a serial number of the subframe in the data frames is 2). {1, 3} expresses that one synchronization sequence is carried on the first subframe and the other synchronization sequence is carried on the third subframe.

The foregoing several types of different subframe resource configurations correspond to synchronization signals with different priority parameters. Because both a user sending the synchronization signals and user equipment receiving the synchronization signals can learn (for example, from local storage or by acquiring from another device) of a correspondence between subframe resource configurations and priority parameters, the user equipment receiving the synchronization signals can distinguish between synchronization signals with different priority parameters according to subframe resources carrying the synchronization signals and the correspondence between the subframe resource configurations and the priority parameters. In an actual system, a required quantity may be determinably determined from the foregoing several time configurations to represent priority parameters of the required quantity of synchronization signals.

Further, it is assumed that N data subframes are included in a data frame, where N is an integer greater than 0. The example in which one data frame carries two synchronization sequences is still used for description (both the two synchronization sequences carry a same synchronization signal), where one synchronization sequence is carried in the first subframe. In this implementation scenario, synchronization signals with different priority parameters may be distinguished by using the following ceil(N/2)−1 types of subframe configuration manners: {1, 2}, {1, 3}, . . . , and {1, ceil(N/2)}, where Ceil( ) is an operation for rounding up to the nearest integer. {1, 2} expresses that one of the synchronization sequences is carried on the first subframe, and the other is carried on the second subframe. Ceil(N/2)−1 synchronization signals with different priority parameters may be distinguished by using ceil(N/2)−1 types of different subframe resource configurations. In an actual system, a required quantity may be determinably determined from the ceil(N/2)−1 time configurations to represent priority parameters of the required quantity of synchronization signals.

In this embodiment, user equipment determines a priority parameter of a synchronization signal, determines, according to the priority parameter, a subframe resource for carrying the synchronization signal, and further sends the synchronization signal by using the determined subframe resource. In this way, user equipment receiving the synchronization signal can identify synchronization signals with different priority parameters according to subframe resources carrying the synchronization signals, and the user equipment receiving the synchronization signal can determine a synchronization signal according to a priority parameter, thereby improving flexibility of a synchronization signal determining manner. In addition, because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different frequency resources.

The frequency resources may be frequencies occupied for sending the synchronization signals. In a Long Term Evolution (LTE) system, a frequency resource may be a physical resource block pair (PRB pair) or a single subcarrier or a subcarrier group in a PRB pair. Synchronization signals with different priority parameters are distinguished by using different frequency resources. That is, the synchronization signals with different priority parameters are distinguished by sending the synchronization signals on PRB pairs with different serial numbers, subcarriers with different serial numbers, or subcarriers with different serial numbers in a subcarrier group.

The following uses an example in which synchronization signals with different priority parameters are distinguished by using PRB pairs with different serial numbers. It can be understood that the example may be extended to that synchronization signals with different priority parameters are distinguished by subcarriers with different serial numbers, or subcarriers with different serial numbers in a subcarrier group.

Figure 4:
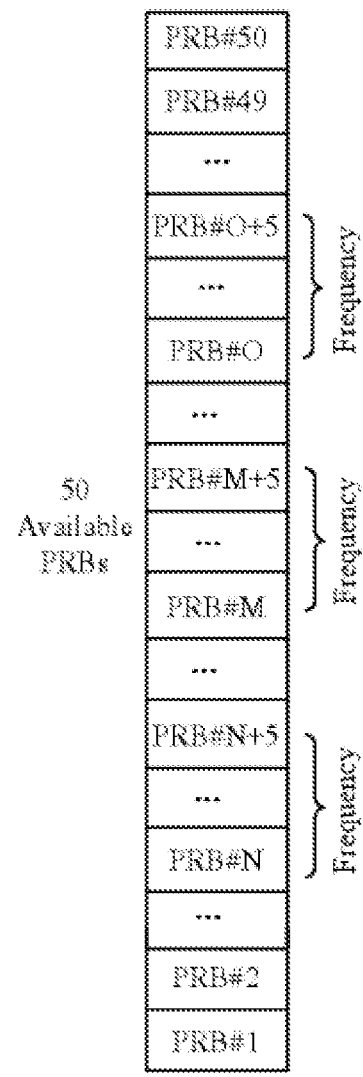
FIG. 4 is a schematic diagram of a configuration of a frequency domain resource in still another embodiment of a synchronization signal carrying method according to the present invention.

As shown in FIG. 4, it is assumed that a bandwidth of a system is 50 PRB pairs and sending one synchronization signal needs to occupy six consecutive PRBs. In this implementation scenario, there are a maximum of seven configurations of six distinguishable consecutive PRBs for synchronization signals with different priority parameters. Seven synchronization signals with different priority parameters can be distinguished by using the seven resource configurations of different PRB pair resources. In an actual system, a required quantity may be selectively determined from the seven frequency configurations to represent priority parameters of the required quantity of synchronization signals.

As shown in FIG. 4, three available physical resources f1, f2, and f3 in a system may be used to carry a synchronization signal in the system. Each physical resource may include one or more PRB pairs, where different physical resources consist of different PRB pairs, and PRB pairs between the physical resources may not overlap or may partially overlap. Then, f1, f2, and f3 may be used to separately carry synchronization signals with different priority parameters.

Further, it is assumed that N PRB pairs are included in a data frame, where N is an integer greater than 0, and M consecutive PRB pairs need to be occupied for sending a synchronization signal, where M is an integer greater than 0. In this implementation scenario, there are floor(N/M) distinguishable PRB pair configurations of synchronization signals with different priority parameters, where Floor( ) expresses an operation for rounding down to the nearest integer. Floor(N/M) synchronization signals with different priority parameters can be distinguished by using the floor (N/M) different frequency resource configurations. In an actual system, a required quantity may be selectively determined from the floor(N/M) frequency configurations to represent priority parameters of the required quantity of synchronization signals.

In this embodiment, user equipment determines a priority parameter of a synchronization signal, determines, according to the priority parameter, a PRB pair for carrying the synchronization signal, and further sends the synchronization signal by using the determined PRB pair. In this way, user equipment receiving the synchronization signal can identify synchronization signals with different priority parameters according to PRB pairs carrying the synchronization signals, and the user equipment receiving the synchronization signal can determine a synchronization signal according to a priority parameter, thereby improving flexibility of a synchronization signal determining manner. In addition, because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different codeword resources.

The codeword resources may be codeword sequences used for sending the synchronization signals. Distinguishing between priority parameters of synchronization signals depending on codeword sequences is distinguishing between the priority parameters of the signals by sending the synchronization signals in different codeword sequences. Generally, one synchronization signal may be corresponding to one or more synchronization sequences and one synchronization sequence may be carried using one or more codeword sequences, where multiple codeword sequences may be located in different symbols.

It is assumed that there are three available codewords, for example, sequences with a length of 63 bits, in a system:

$$d_u(n) = e^{-j\frac{\pi u n(n+1)}{63}} \quad n = 0, 1, \ldots, 30, 31, 32, \ldots, 61, 62,$$

where a value of u is 25, 29, or 34, and three different codeword sequences are generated separately. That is, different codeword sequences may be generated by using different values of u, where three codeword sequences obtained by using the value 25, 29, or 34 of u have good correlation properties.

In this implementation scenario, three different synchronization signals may be distinguished by using the three different codeword sequences. In an actual system, a required quantity may be selectively determined from the three codeword sequences to represent priority parameters of the required quantity of synchronization signals.

Figure 5:
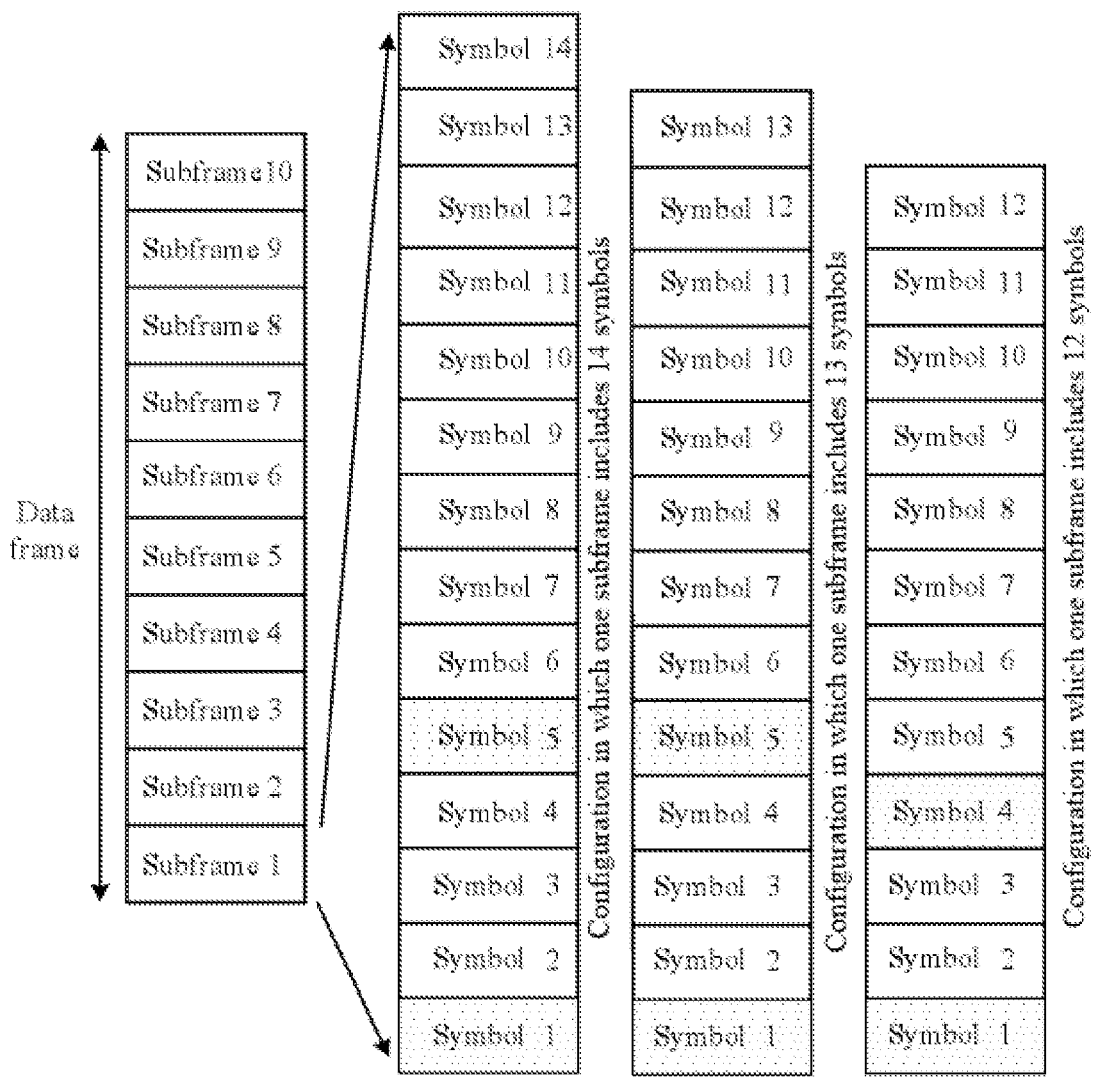
FIG. 5 is a schematic diagram of a configuration of a codeword resource in still another embodiment of a synchronization signal carrying method according to the present invention.

As shown in FIG. 5, 10 subframes are included in one data frame and each of the 10 subframes includes a same quantity of symbols, for example, there may be 14 symbols, 13 symbols, and 12 symbols. It is assumed that in a subframe carrying a synchronization signal among the 10 subframes, two symbols carry one synchronization signal and one symbol carries one synchronization sequence, where one synchronization signal corresponds to two synchronization sequences. For example: As shown in FIG. 5, in a subframe including 14 symbols, one synchronization sequence may be carried by using symbol 1, and the other synchronization sequence may be carried by using symbol 5. In a subframe including 13 symbols, one synchronization sequence may be carried by using symbol 1, and the other synchronization sequence may be carried by using symbol 5. In a subframe including 12 symbols, one synchronization sequence may be carried by using symbol 1 and the other synchronization sequence may be carried by using symbol 4. If there are three synchronization sequences that can be carried in a symbol, there may be a total of 3*3=9 different configurations of carrying synchronization sequences in two symbols. That is, there are nine distinguishable priority parameters of synchronization signals, and therefore, nine different priority parameters can be distinguished.

In addition, in the foregoing example, it can be seen that the spacing between two carrying symbols carrying a same synchronization signal is {3}, {3}, and {2} separately, where a spacing {3} expresses that a spacing is three symbols and, if a spacing is {0}, it expresses that two symbols are adjacent and no other symbols exist between the two symbols. In an actual system, if a quantity of symbols is 14, according to the needs of the system, a spacing between two carrying symbols carrying a same synchronization signal may be any value in {0}, {1}, {2}, {3}, {4}, {5}, {6}, {7}, {8}, {9}, {10}, {11}, and {12}.

Figure 6:
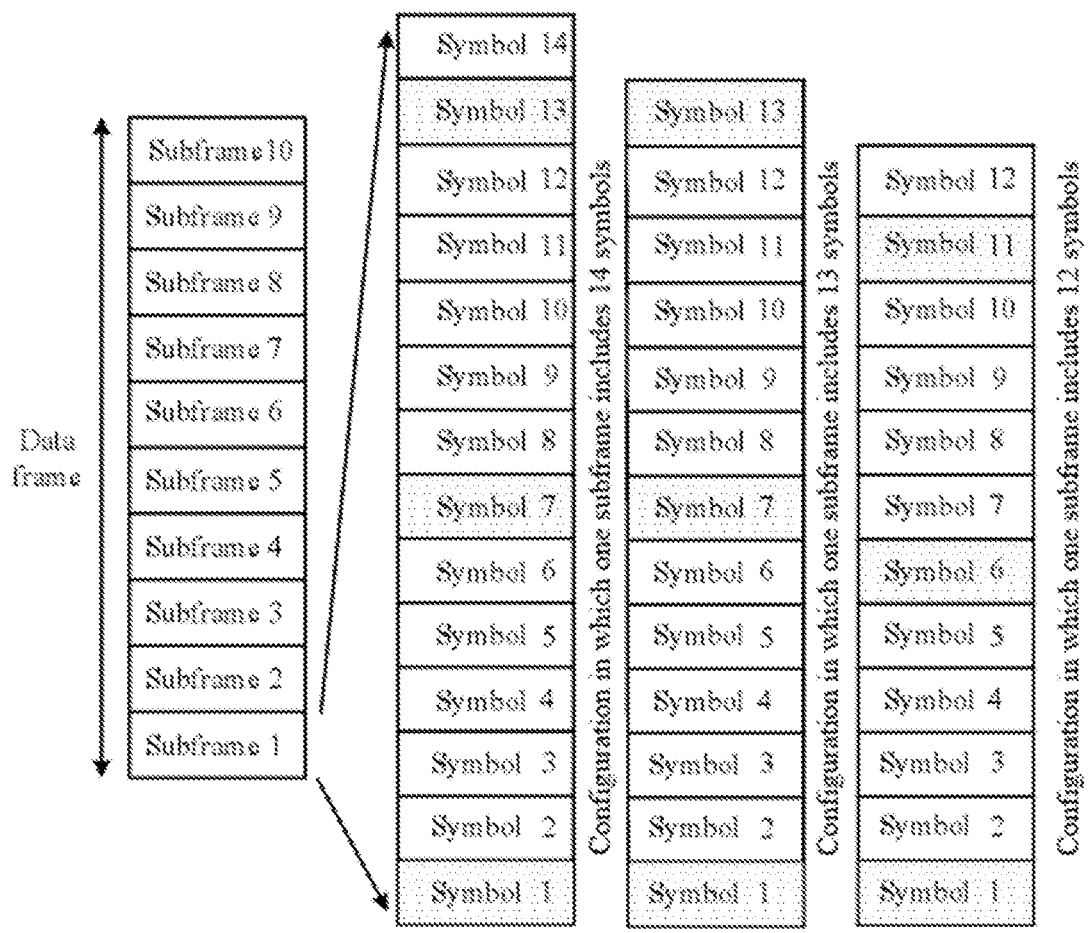
FIG. 6 is a schematic diagram of a configuration of a codeword resource in still another embodiment of a synchronization signal carrying method according to the present invention.

Further, as shown in FIG. 6, 10 subframes are included in one data frame and each of the 10 subframes includes a same quantity of symbols, there may be 14 symbols, 13 symbols, and 12 symbols. In a subframe carrying a synchronization signal among the 10 subframes, three symbols carry one synchronization signal and each symbol is used to carry one synchronization sequence, that is, one synchronization signal corresponds to three synchronization sequences. For example, as shown in FIG. 6, in a subframe including 14 symbols, one synchronization sequence may be carried by using symbol 1, another synchronization sequence may be carried by using symbol 7, and still another synchronization sequence may be carried by using a symbol 13. In a subframe including 13 symbols, one synchronization sequence may be carried by using symbol 1, another synchronization sequence may be carried by using symbol 5, and still another synchronization sequence may be carried by using symbol 13. In a subframe including 12 symbols, one synchronization sequence may be carried by using symbol 1, another synchronization sequence may be carried by using symbol 6, and still another synchronization sequence may be carried by using symbol 11. If there are three synchronization sequences that can be carried in a symbol, there may be a total of 3*3*3=27 different configurations of carrying synchronization sequences in two symbols. That is, there may be 27 distinguishable synchronization signals, and therefore, 27 different priority parameters may be distinguished.

In addition, in the foregoing example, we see that the spacing between two carrying symbols that carry a same synchronization signal is {5}, {5}, and {4} separately, where a spacing {5} expresses that a spacing is five symbols and, if a spacing is {0}, it expresses that two symbols are adjacent and no other symbols exist between the two symbols. In an actual system, if a quantity of symbols is 14, according to needs of the system, a spacing between two carrying symbols carrying a same synchronization signal may be any one of {0}, {1}, {2}, {3}, {4}, {5}, {6}, {7}, {8}, {9}, {10}, {11}, and {12}.

Further, it is assumed that there are N available codeword sequences in a system. N different priority parameters of synchronization signals may be distinguished by using the N different codeword sequences. In an actual system, a required quantity may be selectively determined from configurations of the N codeword sequences to represent priority parameters of the required quantity of synchronization signals.

In this embodiment, user equipment determines a priority parameter of a synchronization signal, determines, according to the priority parameter, a codeword sequence for carrying the synchronization signal, and further sends the synchronization signal by using the determined codeword sequence. In this way, user equipment receiving the synchronization signal can identify synchronization signals with different priority parameters according to codeword sequences carrying the synchronization signals, and the user equipment receiving the synchronization signal can select a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different time domain resources and frequency domain resources.

The time resources herein may be data frames, subframes, timeslots, or OFDM symbols, for sending synchronization signals. The frequency resources may be frequencies occupied for sending the synchronization signals. In an LTE system, a frequency resource may be a PRB pair, or may be a single subcarrier or a subcarrier group in a PRB pair. Distinguishing between priority parameters of synchronization signals according to time resources and frequency resources is distinguishing between the priority parameters of synchronization signals by sending the synchronization signals in data frames with different serial numbers, subframes with different serial numbers in a data frame, timeslots with different serial numbers, and OFDM symbols with different serial numbers, by using PRBs with different serial numbers, subcarriers with different serial numbers, or subcarriers with different serial numbers in a subcarrier group.

In an example in which synchronization signals with different priority parameters are distinguished by using subframes with different serial numbers in a data frame and PRB pairs with different serial numbers, the example may be extended to that priority parameters of synchronization signals are distinguished by using data frames with different serial numbers and using subcarriers or subcarrier groups in a PRB pair, or by using OFDM symbols with different serial numbers and using subcarriers or subcarrier groups in a PRB pair.

It is assumed that 10 subframes are included in a data frame in a system, and it is assumed that two synchronization sequences are carried in one data frame, where the two synchronization sequences carry a same synchronization signal and one synchronization sequence is carried in the first subframe or carried in the sixth subframe. In addition, it is assumed that two different PRB configurations in the system are used to carry a synchronization signal, for example, a first PRB configuration includes the first to the sixth PRB pairs and a second PRB configuration includes the seventh to twelfth PRB pairs. In the first five subframes, a synchronization signal is carried by using the first PRB configuration, and in the last five subframes, a synchronization signal is carried by using the second PRB configuration. In this implementation scenario, the following 17 distinguishable combinations of configurations of a subframe and a PRB for carrying a synchronization signal are available: $\{1(f1),2(f1)\}$, $\{1(f1),3(f1)\}$, $\{1(f1),4(f1)\}$, $\{1(f1),5(f1)\}$, $\{6(f2,7(f2)\}$, $\{6(f2),8(f2)\}$, $\{6(f2),9(f2)\}$, $\{6(f2),10(f2)\}$, $\{1(f1),6(f2)\}$, $\{1(f1),7(f2)\}$, $\{1(f1),8(f2)\}$, $\{1(f1),9(f2)\}$, $\{1(f1),10(f2)\}$, $\{2(f1),6(f2)\}$, $\{3(f1),6(f2)\}$, $\{4(f1),6(f2)\}$, and $\{5(f1),6(f2)\}$, where $\{1(f1),2(f1)\}$ expresses that a synchronization signal is carried by using the first PRB configuration in the first subframe and carried by using the first PRB configuration in the second subframe, and $\{1(f1),6(f2)\}$ expresses that a synchronization signal is carried by using the first PRB configuration in the first subframe and carried by using the second PRB configuration in the sixth subframe. 17 different priority parameters of synchronization signals can be distinguished by using the 17 different configurations of a subframe resource and a PRB pair resource. In an actual system, a required quantity may be selectively determined from the 17 time configurations to represent priority parameters of the required quantity of synchronization signals. It can be understood that the first PRB in a subframe is selected in all the foregoing 17 configurations, but in actual determining, it is not necessary that the first PRB of each subframe is selected. In this case, a quantity of resource configurations that can be obtained is greater than 17.

Further, it is assumed that 2*N subframes are included in a data frame in a system, and it is assumed that a total of two synchronization sequences are carried in one data frame, where the two synchronization sequences carry a same synchronization signal and one synchronization sequence is carried in the first subframe or carried in the (N+1)th subframe, where N is an integer greater than 0. In addition, it is assumed that two different PRB configurations in the system are used to carry a synchronization signal, for example, in the first N subframes, a synchronization signal is carried by using a first PRB configuration; and in the last N subframes, a synchronization signal is carried by using a second PRB configuration. Under this condition, 4*N−3 distinguishable configurations of a subframe and a PRB that carry a synchronization signal are available. 4*N−3 different priority parameters of synchronization signals can be distinguished by using the 4*N−3 different configurations of a subframe resource and a PRB resource. In an actual system, a required quantity may be selectively determined from the 4*N−3 time configurations to represent priority parameters of the required quantity of synchronization signals.

In this embodiment, user equipment determines a priority parameter of a synchronization signal, determines, according to the priority parameter, a subframe and a PRB pair for carrying the synchronization signal, and further sends the synchronization signal by using the determined subframe and PRB pair. In this way, user equipment receiving the synchronization signal can identify synchronization signals with different priority parameters according to subframes and PRB pairs that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different time domain resources and codeword resources.

The time domain resources herein may be data frames, subframes, timeslots, or orthogonal frequency division multiplexing OFDM symbols, for sending synchronization signals. Distinguishing between synchronization signals with different priority parameters according to different time domain resources is distinguishing between signals and synchronization signals with different priority parameters by sending the synchronization signals in data frames with different serial numbers, subframes with different serial numbers, timeslots with different serial numbers, OFDM symbols with different serial numbers, or any combination of the foregoing four resources. The codeword resources refer to codeword sequences used for sending the synchronization signals. Distinguishing between priority parameters of signals depending on time resources and codeword resources is distinguishing between the priority parameters of the signals by sending the synchronization signals by using different codeword sequences in data frames with different serial numbers, subframes with different serial numbers, or OFDM symbols with different serial numbers.

In an example in which priority parameters of synchronization signals are distinguished by using subframes and codeword sequences, the example may be conveniently extended to that priority parameters of synchronization signals are distinguished by using data frames and codewords or by using OFDM symbols and codewords.

It is assumed that 10 subframes are included in a data frame in a system, and it is assumed that a total of two synchronization sequences are carried in one data frame, where the two synchronization sequences carry a same synchronization signal and one synchronization sequence is carried in the first subframe or carried in the sixth subframe. It is assumed that two different codeword sequences in the system are used to carry the synchronization sequences: in the first five subframes, a synchronization signal is carried by using a first codeword sequence; and in last five subframes, a synchronization signal is carried by using a second codeword sequence. Under this condition, the following 17 distinguishable combinations of a subframe and a codeword sequence that carry a synchronization signal are available: {1(s1),2(s1)}, {1(s1),3(s1)}, {1(s1),4(s1)}, {1(s1),5(s1)}, {6(s2,7(s2)}, {6(s2),8(s2)}, {6(s2),9(s2)}, {6(s2),10(s2)}, {1(s1),6(s2)}, {1(s1),7(s2)}, {1(s1),8(s2)}, {1(s1),9(s2)}, {1(s1),10(s2)}, {2(s1),6(s2)}, {3(s1),6(s2)}, {4(s1),6(s2)}, and {5(s1),6(s2)}, where {1(s1),2(s1)} expresses that a synchronization signal is carried by using the first codeword sequence in the first subframe and carried by using the first codeword sequence in the second subframe, and {1(s1),6(s2)} expresses that a synchronization signal is carried by using the first codeword sequence in the first subframe and carried by using the second codeword sequence in the sixth subframe. 17 different priority parameters of synchronization signals can be distinguished by using the 17 different configurations of a subframe resource and a codeword sequence. In an actual system, a required quantity may be selectively determined from the 17 time configurations to represent priority parameters of the required quantity of synchronization signals.

Further, it is assumed that 2*N subframes are included in a data frame in a system, and it is assumed that a total of two synchronization sequences are carried in one data frame, where the two synchronization sequences carry a same synchronization signal and one synchronization sequence is carried in the first subframe or carried in the (N+1)th subframe. In addition, it is assumed that two different codeword sequences in the system are used to carry the synchronization sequences: in the first N subframes, one synchronization sequence is carried by using a first codeword sequence; and in the last N subframes, the other synchronization sequence is carried by using a second codeword sequence. Under this condition, 4*N−3 distinguishable configurations of a subframe and a codeword sequence that carry a synchronization signal are available. 4*N−3 different priority parameters of synchronization signals can be distinguished by using the 4*N−3 different configurations of a subframe resource and a codeword sequence. In an actual system, a required quantity may be determinably determined from the 4*N−3 time configurations and codeword configurations to represent priority parameters of the required quantity of synchronization signals.

In this embodiment, user equipment determines a priority parameter of a synchronization signal, determines, according to the priority parameter, a subframe and a codeword sequence for carrying the synchronization signal, and further sends the synchronization signal by using the determined subframe and codeword sequence. In this way, user equipment receiving the synchronization signal can identify synchronization signals with different priority parameters according to subframes and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different frequency resources and codeword resources.

The frequency resources may be frequencies occupied for sending the synchronization signals. A frequency resource may be a PRB pair, or may be a single subcarrier or a subcarrier group in a PRB pair. Synchronization signals with different priority parameters are distinguished by using different frequency resources. That is, the synchronization signals with different priority parameters are distinguished by sending the synchronization signals on PRB pairs with different serial numbers, subcarriers with different serial numbers, or subcarriers with different serial numbers in a subcarrier group. The codeword resources refer to codeword sequences used for sending the synchronization signals.

Distinguishing between priority parameters of signals depending on frequency resources and codeword resources is distinguishing between the priority parameters of the signals by sending the synchronization signals by using different codeword sequences on PRB pairs with different serial numbers, or subcarriers or subcarrier groups with different serial numbers in different PRB pairs.

In an example in which priority parameters of synchronization signals are distinguished by using PRB pairs and codeword sequences, the example may be conveniently extended to that levels of synchronization signals are distinguished by using subcarriers in a PRB and codeword sequences or by using subcarrier groups in a PRB and codeword sequences.

It is assumed that 10 subframes are included in a data frame in a system, and in addition, it is assumed that a total of one synchronization sequence is carried in one data frame, where the synchronization sequence is carried in the first subframe, one synchronization signal corresponds to one synchronization sequence, and one synchronization sequence is carried by using two codeword sequences. In this case, two different codeword sequences in a system are used to carry a synchronization sequence. In addition, it is assumed that two different PRB configurations in the system are used to carry a synchronization sequence. Under this condition, the following four distinguishable combinations of a PRB configuration and a codeword sequence that carry a synchronization signal are available: {f1(s1)}, {f1(s2)}, {f2(s1)}, and {f2(s2)}, where {f1(s1)} expresses that a synchronization signal is carried by using a first codeword sequence in a first PRB configuration in the first subframe. Four different priority parameters of synchronization signals can be distinguished by using the four different configurations of a time resource and a frequency resource. In an actual system, a required quantity may be determinably determined from the four time configurations to represent priority parameters of the required quantity of synchronization signals.

Further, it is assumed that a synchronization signal is carried in the first subframe in one data frame. In addition, it is assumed that M different codeword sequences in a system are used to carry one synchronization signal, where M is an integer greater than 0. In addition, it is assumed that N different PRB configurations in a system are used to carry a synchronization sequence, where N is an integer greater than 0. Under this condition, M*N distinguishable configurations of a subframe and a codeword that carry a synchronization signal are available. M*N different priority parameters of synchronization signals can be distinguished by using the M*N different configurations of a frequency resource and a codeword resource. In an actual system, a required quantity may be selectively determined from the M*N frequency configurations and codeword configurations to represent priority parameters of the required quantity of synchronization signals.

In this embodiment, user equipment determines a priority parameter of a synchronization signal, determines, according to the priority parameter, a PRB pair and a codeword sequence for carrying the synchronization signal, and further sends the synchronization signal by using the determined PRB pair and codeword sequence. In this way, user equipment receiving the synchronization signal can identify synchronization signals with different priority parameters according to PRB pairs and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different time resources and codeword resources.

For specific descriptions about the time resource and the codeword resource herein, reference may be made to related descriptions in the foregoing embodiments, and details are not described herein again.

In an example in which priority parameters of synchronization signals are distinguished by using subframes and codeword sequences, the example may be conveniently extended to that priority parameters of synchronization signals are distinguished by using data frames and codeword sequences or by using OFDM symbols and codeword sequences.

It is assumed that 10 subframes are included in a data frame in a system, and it is assumed that a total of two synchronization sequences are carried in one data frame, where the two synchronization sequences correspond to one synchronization signal and one synchronization sequence is carried in the first subframe or carried in the sixth subframe. In addition, it is assumed that two different codeword sequences in the system are used to separately carry two synchronization sequences: in the first five subframes, one synchronization sequence is carried by using a first codeword sequence; and in the last five subframes, the other synchronization sequence is carried by using a second codeword sequence. Under this condition, the following 17 distinguishable combinations of a subframe and a codeword sequence that carry a synchronization signal are available: {1(s1),2(s1)}, {1(s1),3(s1)}, {1(s1),4(s1)}, {1(s1),5(s1)}, {6(s2),7(s2)}, {6(s2),8(s2)}, {6(s2),9(s2)}, {6(s2),10(s2)}, {1(s1),6(s2)}, {1(s1),7(s2)}, {1(s1),8(s2)}, {1(s1),9(s2)}, {1(s1),10(s2)}, {2(s1),6(s2)}, {3(s1),6(s2)}, {4(s1),6(s2)}, and {5(s1),6(s2)}, where {1(s1),2(s1)} expresses that a synchronization signal is carried by using the first codeword sequence in the first subframe and carried by using the first codeword sequence in the second subframe, and {1(s1),6(s2)} expresses that a synchronization signal is carried by using the first codeword sequence in the first subframe and carried by using the second codeword sequence in the sixth subframe. 17 different priority parameters of synchronization signals can be distinguished by using the 17 different configurations of a time resource and a frequency resource. In an actual system, a required quantity may be determinably determined from the 17 time configurations to represent priority parameters of the required quantity of synchronization signals.

Further, it is assumed that 2*N subframes are included in a data frame in a system, and it is assumed that a total of two synchronization sequences are carried in one data frame, where one synchronization sequence is carried in the first subframe or carried in the (N+1)th subframe. In addition, it is assumed that two different codeword sequences in the system are used to carry the synchronization sequences: in the first N subframes, one synchronization sequence is carried by using a first codeword sequence; and in the last N subframes, the other synchronization sequence is carried by using a second codeword sequence. Under this condition, 4*N−3 distinguishable configurations of a subframe and a codeword that carry a synchronization signal are available. 4*N−3 different priority parameters of synchronization signals can be distinguished by using the 4*N−3 different configurations of a time resource and a codeword resource. In an actual system, a required quantity may be selectively determined from the 4*N−3 time configurations and codeword configurations to represent priority parameters of the required quantity of synchronization signals.

In this embodiment, user equipment determines a priority parameter of a synchronization signal, determines, according to the priority parameter, a subframe and a codeword sequence for carrying the synchronization signal, and further sends the synchronization signal by using the determined subframe and codeword sequence. In this way, user equipment receiving the synchronization signal can identify synchronization signals with different priority parameters according to subframes and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different frequency resources and codeword resources.

For specific descriptions about the frequency resource and the codeword resource herein, reference may be made to related descriptions in the foregoing embodiments, and details are not described herein again.

In an example in which priority parameters of synchronization signals are distinguished by using PRB pairs and codeword sequences, the example may be conveniently extended to that priority parameters of synchronization signals are distinguished by using subcarriers in a PRB pair and codeword sequences or by using subcarrier groups in a PRB pair and codeword sequences.

It is assumed that 10 subframes are included in a data frame in a system, and it is assumed that a total of one synchronization signal is carried in one data frame, where the synchronization signal is carried in the first subframe, one synchronization signal corresponds to one synchronization sequence, and one synchronization sequence is carried by using two codeword sequences. In this case, two different codeword sequences in the system are used to carry one synchronization signal. In addition, it is assumed that two different PRB configurations in the system are used to carry a synchronization signal. Under this condition, the following four distinguishable combinations of a PRB configuration and a codeword sequence that carry a synchronization signal are available: {f1(s1)}, {f1(s2)}, {f2(s1)}, and {f2(s2)}, where {f1(s1)} expresses that a synchronization signal is carried by using a first codeword sequence in a first PRB configuration in the first subframe. Four different priority parameters of synchronization signals can be distinguished by using the four different configurations of a time resource and a frequency resource. In an actual system, a required quantity may be determinably determined from the four time configurations to represent priority parameters of the required quantity of synchronization signals.

Further, by the same analogy, it is assumed that a synchronization signal is carried in the first subframe in one data frame. In addition, it is assumed that M different codeword sequences in a system are used to carry one synchronization signal. In addition, it is assumed that N different PRB configurations in the system are used to carry a synchronization signal. Under this condition, M*N distinguishable configurations of a subframe and a codeword that carry a synchronization signal are available. M*N different priority parameters of synchronization signals can be distinguished by using the M*N different configurations of a frequency resource and a codeword resource. In an actual system, a required quantity may be selectively determined from the M*N frequency configurations and codeword configurations to represent priority parameters of the required quantity of synchronization signals.

In this embodiment, user equipment determines a priority parameter of a synchronization signal, determines, according to the priority parameter, a PRB pair and a codeword sequence for carrying the synchronization signal, and further sends the synchronization signal by using the determined PRB pair and codeword sequence. In this way, user equipment receiving the synchronization signal can identify synchronization signals with different priority parameters according to PRB pairs and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different time resources, frequency resources, and codeword resources.

For specific descriptions about the time resource, the frequency resource, and the codeword resource herein, reference may be made to related descriptions in the foregoing embodiments.

In an example in which priority parameters of synchronization signals are distinguished by using configurations of a subframe, a codeword sequence, and a PRB, the example may be conveniently extended to that priority parameters of synchronization signals are distinguished by using another manner.

It is assumed that 10 subframes are included in a data frame in a system, and it is assumed that a total of two synchronization sequences are carried in one data frame, where the two synchronization sequences correspond to one synchronization signal, and one synchronization sequence is carried in the first subframe or carried in the sixth subframe. In addition, it is assumed that two different codeword sequences in the system are used to carry one synchronization signal. In addition, it is assumed that two different PRB configurations in the system are used to carry one synchronization signal: in the first five subframes, one synchronization sequence of the synchronization signal is carried by using a first PRB configuration; and in the last five subframes, the other synchronization sequence of the synchronization signal is carried by using a second PRB configuration. Under this condition, 17*4 distinguishable combinations of configurations of a subframe, a codeword sequence, and a PRB that carry a synchronization signal are available. 17 combinations that use merely codeword 1 are shown in the following table:

TABLE 1

Table of combinations of different subframe configurations

| Configuration No. | Subframe 1 | Subframe 2 | Subframe 3 | Subframe 4 | Subframe 5 | Subframe 6 | Subframe 7 | Subframe 8 | Subframe 9 | Subframe 10 |
|---|---|---|---|---|---|---|---|---|---|---|
| 1 | (f1, s1) | (f1, s1) | | | | | | | | |
| 2 | (f1, s1) | | (f1, s1) | | | | | | | |
| 3 | (f1, s1) | | | (f1, s1) | | | | | | |
| 4 | (f1, s1) | | | | (f1, s1) | | | | | |
| 5 | | | | | | (f2, s1) | (f2, s1) | | | |
| 6 | | | | | | (f2, s1) | | (f2, s1) | | |
| 7 | | | | | | (f2, s1) | | | (f2, s1) | |
| 8 | | | | | | (f2, s1) | | | | (f2, s1) |
| 9 | (f1, s1) | | | | | (f2, s1) | | | | |
| 10 | | (f1, s1) | | | | (f2, s1) | | | | |
| 11 | | | (f1, s1) | | | (f2, s1) | | | | |
| 12 | | | | (f1, s1) | | (f2, s1) | | | | |
| 13 | | | | | (f1, s1) | (f2, s1) | | | | |
| 14 | (f1, s1) | | | | | | (f2, s1) | | | |
| 15 | (f1, s1) | | | | | | | (f2, s1) | | |
| 16 | (f1, s1) | | | | | | | | (f2, s1) | |
| 17 | (f1, s1) | | | | | | | | | (f2, s1) |

In configuration 1, a synchronization signal is sent by using a first codeword sequence in a first PRB configuration in the first frame and sent by using the first codeword sequence in the first PRB configuration in the second frame; and in configuration 9, a synchronization signal is sent by using the first codeword sequence in the first PRB configuration in the first frame and sent by using the first codeword sequence in a second PRB configuration in the sixth frame.

The foregoing table shows 17 configurations that use merely codeword 1. For two adjacent synchronization sequences, {Codeword 1, Codeword 2}, {Codeword 2, Codeword 1}, and {Codeword 2, Codeword 2} correspond to 17 configurations separately. Therefore, there are 17*4 configurations in total.

17*4 different priority parameters of synchronization signals can be distinguished by using the 17*4 different configurations of a time resource, a frequency resource, and a codeword resource. In an actual system, a required quantity may be determinably determined from the 17*4 time configurations to represent priority parameters of the required quantity of synchronization signals.

Further, it is assumed that 2*N subframes are included in a data frame in a system, where N is an integer greater than 0, and it is assumed that a total of two synchronization sequences are carried in one data frame, where the two synchronization sequences correspond to one synchronization signal and one synchronization sequence is carried in the first subframe or carried in the (N+1)th subframe. In addition, it is assumed that two different codeword sequences in the system are used to carry a synchronization signal. In addition, it is assumed that two different PRB configurations in the system are used to carry a synchronization signal: in the first N subframes, a synchronization signal is carried by using a first PRB configuration; and in the last N subframes, a synchronization signal is carried by using a second PRB configuration. Under this condition, 4*(4*N−3) distinguishable combinations of configurations of a subframe, a codeword sequence, and a PRB that carry a synchronization signal are available. 4*(4*N−3) different priority parameters of synchronization signals can be distinguished by using the 4*(4*N−3) different configurations of a time resource and a codeword resource. In an actual system, a required quantity may be determinably determined from the 4*(4*N−3) time configurations, codeword configurations, and frequency configurations to represent priority parameters of the required quantity of synchronization signals.

In this embodiment, user equipment determines a priority parameter of a synchronization signal, determines, according to the priority parameter, a subframe, a PRB pair, and a codeword sequence for carrying the synchronization signal, and further sends the synchronization signal by using the determined subframe, PRB pair, and codeword sequence. In this way, user equipment receiving the synchronization signal can identify synchronization signals with different priority parameters according to subframes, PRB pairs, and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

In an embodiment of a synchronization signal carrying method provided in the present invention, synchronization signals with different priority parameters may be distinguished by using different time resources and codeword resources.

It is assumed that 10 subframes are included in a data frame in a system, and it is assumed that a total of two synchronization sequences are carried in one data frame, where the two synchronization sequences correspond to one synchronization signal and one synchronization sequence is carried in the first subframe or carried in the sixth subframe. In addition, it is assumed that two different codeword sequences in the system are used to carry a synchronization signal: in the first five subframes, one synchronization sequence of the synchronization signal is carried by using a first codeword sequence; and in the last five subframes, the other synchronization sequence of the synchronization signal is carried by using a second codeword sequence. Under this condition, the following 17 distinguishable combinations of a subframe and a codeword sequence that carry a synchronization signal are available: {1(s1),2(s1)}, {1(s1),3(s1)}, {1(s1),4(s1)}, {1(s1),5(s1)}, {6(s2),7(s2)}, {6(s2),8(s2)}, {6(s2),9(s2)}, {6(s2),10(s2)}, {1(s1),6(s2)}, {1(s1),7(s2)}, {1(s1),8(s2)}, {1(s1),9(s2)}, {1(s1),10(s2)}, {2(s1),6(s2)}, {3(s1),6(s2)}, {4(s1),6(s2)}, and {5(s1),6(s2)}, where {1(s1),2(s1)} expresses that a synchronization signal is carried by using codeword 1 in the first subframe and carried by using the first codeword sequence in the second subframe, and {1(s1),6(s2)} expresses that a synchronization signal is carried by using the first codeword sequence in the first subframe and carried by using the second codeword sequence in the sixth subframe.

A table may be used to display all configurations more clearly, as shown in the following table:

selectively determined from the 17 time configurations to represent priority parameters of the required quantity of synchronization signals.

Further, it is assumed that 2*N subframes are included in a data frame in a system, where N is an integer greater than 0, and it is assumed that a total of two synchronization sequences are carried in one data frame, where the two synchronization sequences correspond to one synchronization signal, and one synchronization sequence is carried in the first subframe or carried in the (N+1)th subframe. In addition, it is assumed that two different codeword sequences in the system are used to carry a synchronization signal: in the first N subframes, one codeword sequence of the synchronization signal is carried by using a first codeword sequence; and in the last N subframes, another codeword sequence of the synchronization signal is carried by using a second codeword sequence. Under this condition, 4*N−3 distinguishable configurations of a subframe and a codeword that carry a synchronization signal are available. 4*N−3 different priority parameters of synchronization signals can be distinguished by using the 4*N−3 different configurations of a time resource and a codeword resource. In an actual system, a required quantity may be determinably determined from the 4*N−3 time configurations and codeword configurations to represent priority parameters of the required quantity of synchronization signals.

In this embodiment, user equipment determines a priority parameter of a synchronization signal, determines, according to the priority parameter, a subframe and a codeword sequence for carrying the synchronization signal, and further sends the synchronization signal by using the determined subframe and codeword sequence. In this way, user equipment receiving the synchronization signal can identify synchronization signals with different priority parameters

TABLE 2

Table of different combinations of a time and a codeword

| Configuration No. | Subframe 1 | Subframe 2 | Subframe 3 | Subframe 4 | Subframe 5 | Subframe 6 | Subframe 7 | Subframe 8 | Subframe 9 | Subframe 10 | {Level, Layer} |
|---|---|---|---|---|---|---|---|---|---|---|---|
| 1 | S1 | S1 | | | | | | | | | {1, 1} |
| 2 | S1 | | S1 | | | | | | | | {1, 2} |
| 3 | S1 | | | S1 | | | | | | | {1, 3} |
| 4 | S1 | | | | S1 | | | | | | {1, 4} |
| 5 | | | | | | S2 | S2 | | | | {2, 1} |
| 6 | | | | | | S2 | | S2 | | | {2, 2} |
| 7 | | | | | | S2 | | | S2 | | {2, 3} |
| 8 | | | | | | S2 | | | | S2 | {2, 4} |
| 9 | S1 | | | | | S2 | | | | | {3, 1} |
| 10 | | S1 | | | | S2 | | | | | {3, 2} |
| 11 | | | S1 | | | S2 | | | | | {3, 3} |
| 12 | | | | S1 | | S2 | | | | | {3, 4} |
| 13 | | | | | S1 | S2 | | | | | {3, 5} |
| 14 | S1 | | | | | | S2 | | | | {3, 6} |
| 15 | S1 | | | | | | | S2 | | | {3, 7} |
| 16 | S1 | | | | | | | | S2 | | {3, 8} |
| 17 | S1 | | | | | | | | | S2 | {3, 9} |

In configuration 1, a synchronization signal is sent by using the first codeword sequence in the first frame and sent by using the first codeword sequence in the second frame; and in configuration 9, a synchronization signal is sent by using the first codeword sequence in the first frame and sent by using the second codeword sequence in the sixth frame.

Seventeen (17) synchronization signals with different priority parameters can be distinguished by using the 17 different configurations of a time resource and a frequency resource. In an actual system, a required quantity may be according to subframes and codeword sequences that carry the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Figure 7:
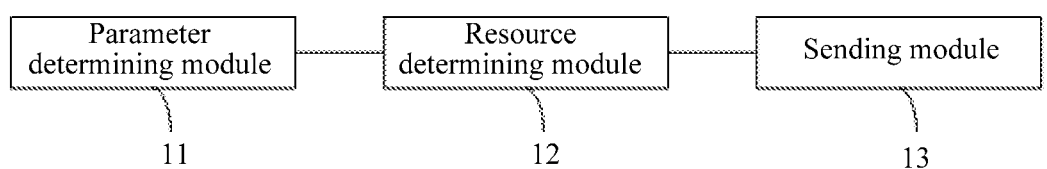
FIG. 7 is a schematic structural diagram of an embodiment of user equipment according to the present invention.

FIG. 7 is a schematic structural diagram of an embodiment of user equipment according to the present invention. The user equipment includes:

a parameter determining module 11 configured to determine a priority parameter of a synchronization signal;

a resource determining module 12 configured to determine, according to the priority parameter, a resource for carrying the synchronization signal, where a configuration of the resource indicates the priority parameter; and a sending module 13 configured to send the synchronization signal to second user equipment by using the resource, so that the second user equipment determines a synchronization signal for the second user equipment.

Optionally, the resource determining module 12 may be specifically configured to determine different resources to carry synchronization signals with different priority parameters.

Optionally, the priority parameter may include at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

Optionally, the source of the synchronization signal may include: a global satellite positioning system number, a network device, or first user equipment.

Optionally, the resource may include: a time domain resource, a frequency domain resource, and a codeword resource; and the different resources are specifically resources that differ in at least one of a time domain, a frequency domain, and a codeword.

Optionally, that time domain resources carrying the synchronization signals are different includes at least one of the following: serial numbers carrying the synchronization signals are different; serial numbers of timeslots carrying the synchronization signals are different; serial numbers of subframes carrying the synchronization signals are different; and serial numbers of OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

Optionally, the resources that differ in a codeword may be specifically resources that differ in a codeword sequence.

Optionally, the codeword sequence may be a sequence with a length of 63 bits:

$$d_u(n) = e^{-j\frac{\pi u n(n+1)}{63}} \quad n = 0, 1, \ldots, 30, 31, 32, \ldots, 61, 62,$$

where a value of u is 25, 29, or 34, and three different codeword sequences are generated separately.

The user equipment for carrying a synchronization signal according to this embodiment of the present invention corresponds to the method embodiments provided in FIG. 1 and FIG. 3 to FIG. 6 in the present invention and is an execution body of the method embodiments. Therefore, for a specific process of executing the synchronization signal carrying method by the user equipment, reference may be made to the method embodiments, and details are not described herein again.

The user equipment according to this embodiment determines a priority parameter of a synchronization signal, determines, according to the priority parameter, a resource for carrying the synchronization signal, and further sends the synchronization signal by using the determined resource. In this way, user equipment receiving the synchronization signal can identify synchronization signals with different priority parameters according to resources carrying the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Figure 8:
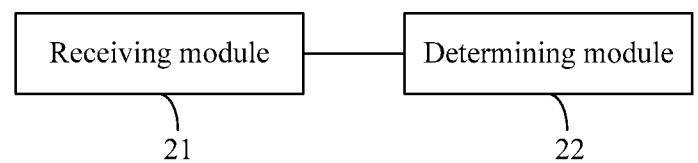
FIG. 8 is a schematic structural diagram of still another embodiment of user equipment according to the present invention.

FIG. 8 is a schematic structural diagram of still another embodiment of user equipment according to the present invention. As shown in FIG. 8, the user equipment includes:

a receiving module 21 configured to receive a synchronization signal sent by first user equipment; and a determining module 22 configured to determine a priority parameter according to a resource carrying the synchronization signal and a correspondence between the resource and the priority parameter of the synchronization signal; and the determining module 22 is further configured to determine a synchronization signal for second user equipment according to the priority parameter.

Optionally, synchronization signals with different priority parameters may be carried by using different resources.

Optionally, the priority parameter may include at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

Optionally, the source of the synchronization signal may include: a global satellite positioning system, a network device, or the first user equipment.

Optionally, the resource may include: a time domain resource, a frequency domain resource, and a codeword resource; and the different resources are specifically resources that differ in at least one of a time domain, a frequency domain, and a codeword.

Optionally, that time domain resources carrying the synchronization signals are different includes at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

Optionally, the resources that differ in a codeword may be specifically resources that differ in a codeword sequence.

Optionally, the codeword sequence may be a sequence with a length of 63 bits:

$$d_u(n) = e^{-j\frac{\pi u n(n+1)}{63}} \quad n = 0, 1, \ldots, 30, 31, 32, \ldots, 61, 62,$$

where
a value of u is 25, 29, or 34.

The user equipment for carrying a synchronization signal according to this embodiment of the present invention corresponds to the method embodiments provided in FIG. 2 to FIG. 6 in the present invention and is an execution body of the method embodiments. Therefore, for a specific process of executing the synchronization signal carrying method by the user equipment, reference may be made to the method embodiments, and details are not described herein again.

The user equipment according to this embodiment of the present invention determines, after receiving a synchronization signal sent by another user equipment, a priority parameter of the synchronization signal according to a resource carrying the synchronization signal and a correspondence between the resource and the priority parameter of the synchronization signal, and determines a synchronization signal for the user equipment itself according to the priority parameter. A determining manner is more flexible. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Figure 9:
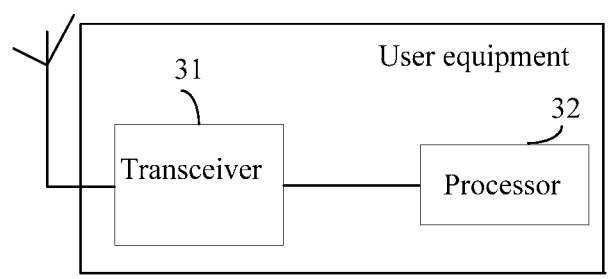
FIG. 9 is a schematic structural diagram of still another embodiment of user equipment according to the present invention.

FIG. 9 is a schematic structural diagram of still another embodiment of user equipment according to the present invention. The user equipment includes: a transceiver 31 and a processor 32, where the processor 31 is configured to determine a priority parameter of a synchronization signal and determine, according to the priority parameter, a resource for carrying the synchronization signal, where a configuration of the resource indicates the priority parameter; and the transceiver 32 is configured to send the synchronization signal to another user equipment by using the resource, so that the another user equipment determines a synchronization signal for the another user equipment.

Optionally, the processor 31 may be specifically configured to determine different resources to carry synchronization signals with different priority parameters.

Optionally, the priority parameter may include at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

Optionally, the source of the synchronization signal includes: a global satellite positioning system, a network device, or the user equipment.

Optionally, the resource includes: a time domain resource, a frequency domain resource, and a codeword resource; and the different resources are specifically resources that differ in at least one of a time domain, a frequency domain, and a codeword.

Optionally, that time domain resources carrying the synchronization signals are different includes at least one of the following: serial numbers of data frames carrying the synchronization signals are different; serial numbers of timeslots carrying the synchronization signals are different; serial numbers of subframes carrying the synchronization signals are different; and serial numbers of OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

Optionally, the resources that differ in a codeword are specifically resources that differ in a codeword sequence.

Optionally, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where
a value of u is 25, 29, or 34, and three different codeword sequences are generated separately.

The user equipment for carrying a synchronization signal according to this embodiment of the present invention corresponds to the method embodiments provided in FIG. 1 and FIG. 3 to FIG. 6 in the present invention and is an execution body of the method embodiments. Therefore, for a specific process of executing the synchronization signal carrying method by the user equipment, reference may be made to the method embodiments, and details are not described herein again.

The user equipment according to this embodiment determines a priority parameter of a synchronization signal, determines, according to the priority parameter, a resource for carrying the synchronization signal, and further sends the synchronization signal by using the determined resource. In this way, user equipment receiving the synchronization signal can identify synchronization signals with different priority parameters according to resources carrying the synchronization signals, and the user equipment receiving the synchronization signal can determine a synchronization signal according to a priority parameter, thereby improving flexibility of a synchronization signal determining manner. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Figure 10:
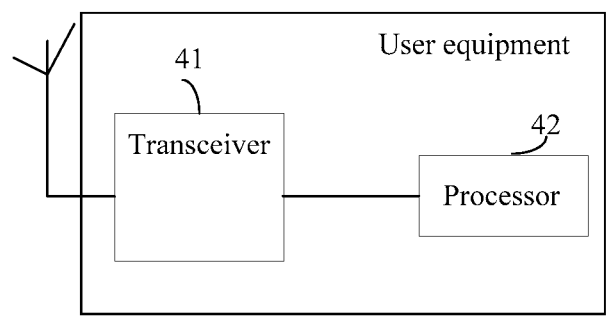
FIG. 10 is a schematic structural diagram of still another embodiment of user equipment according to the present invention.

FIG. 10 is a schematic structural diagram of still another embodiment of user equipment according to the present invention. The user equipment includes: a transceiver 41 and a processor 42, where the transceiver 41 is configured to receive a synchronization signal sent by another user equipment; and the processor 42 is configured to determine a priority parameter according to a resource carrying the synchronization signal and a correspondence between the resource and the priority parameter of the synchronization signal, and determine a synchronization signal for the user equipment according to the priority parameter.

Optionally, synchronization signals with different priority parameters are carried by using different resources.

Optionally, the priority parameter includes at least one of a level and a layer, where the level is used to identify a source of the synchronization signal or used to identify precision of the synchronization signal; and the layer is used to identify a forwarding level of the synchronization signal; and the synchronization signals with different priority parameters are specifically synchronization signals that differ in at least one of the level and the layer.

Optionally, the source of the synchronization signal includes: a global satellite positioning system, a network device, or the first user equipment.

Optionally, the resource includes: a time domain resource, a frequency domain resource, and a codeword resource; and the different resources are specifically resources that differ in at least one of a time domain, a frequency domain, and a codeword.

Optionally, that time domain resources carrying the synchronization signals are different includes at least one of the following: serial numbers of data frames are different; serial numbers of timeslots carrying the synchronization signals are different; serial numbers of subframes carrying the synchronization signals are different; and serial numbers of OFDM symbols carrying the synchronization signals are different.

Optionally, that frequency domain resources carrying the synchronization signals are different includes at least one of the following: serial numbers of PRBs carrying the synchronization signals are different; serial numbers of subcarriers carrying the synchronization signals are different; and serial numbers of subcarriers in a subcarrier group carrying the synchronization signals are different.

Optionally, the resources that differ in a codeword are specifically resources that differ in a codeword sequence.

Optionally, the codeword sequence is a sequence with a length of 63 bits:

$$d_u(n) = e^{-j\frac{\pi u n(n+1)}{63}} \quad n = 0, 1, \ldots, 30, 31, 32, \ldots, 61, 62,$$

where
a value of u is 25, 29, or 34.

The user equipment for carrying a synchronization signal according to this embodiment of the present invention corresponds to the method embodiments provided in FIG. 2 to FIG. 6 in the present invention and is an execution body of the method embodiments. Therefore, for a specific process of executing the synchronization signal carrying method by the user equipment, reference may be made to the method embodiments, and details are not described herein again.

The user equipment according to this embodiment of the present invention determines, after receiving a synchronization signal sent by another user equipment, a priority parameter of the synchronization signal according to a resource carrying the synchronization signal and a correspondence between the resource and the priority parameter of the synchronization signal, and determines a synchronization signal for the user equipment itself according to the priority parameter. A determining manner is more flexible. Because the priority parameter may be at least one of a level and a layer, where the level may express a source or precision of the synchronization signal, and the layer may express a forwarding level of the synchronization signal, the user equipment receiving the synchronization signal can determine the synchronization signal for the user equipment itself according to the source, the precision, or the forwarding level of the synchronization signal. This determining manner is more specific, so that the user equipment receiving the synchronization signal can select a more suitable synchronization signal.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A synchronization signal carrying method comprising:
receiving, by a first user equipment, a first synchronization signal carried by a first pair of codeword sequences and originating from a first source and a second synchronization signal carried by a second pair of codeword sequences and originating from a second source,
wherein at least one of the first and second synchronization signals is indirectly received such that the signal passes through at least two nodes in a network between the first user equipment and the originating first or second source,
wherein a configuration of each of the first and second pairs of codeword sequences indicates the source of the first or second synchronization signal and a forwarding layer related to the number of nodes for the first or second synchronization signal, and
wherein one of three different codeword sequences is placed in each of two symbols in a subframe, such that 9 configurations of pairs of codeword sequences indicate 9 different priorities for synchronization signals;

determining a priority of the first and second synchronization signals based on the configurations of the first and second pairs of codeword sequences;

determining a third pair of codeword sequences from the first and second synchronization signals based on the priority; and sending, by the first user equipment, a third synchronization signal to a second user equipment, wherein the third synchronization signal is carried by the determined third pair of codeword sequences.

2. The method according to claim 1, wherein each of the three different codeword sequences includes a sequence with a length of 63 bits characterized by $$d_u(n) = e^{-j\frac{\pi un(n+1)}{63}} \quad n = 0, 1, \ldots, 30, 31, 32, \ldots, 61, 62,$$

wherein a value of u is 25, 29, or 34 corresponding to the three different codeword sequences.

3. A user equipment comprising:
a processor configured to:
receive a first synchronization signal carried by a first pair of codeword sequences and originating from a first source and a second synchronization signal carried by a second pair of codeword sequences and originating from a second source, wherein at least one of the first and second synchronization signals is indirectly received such that the signal passes through at least two nodes in a network between the first user equipment and the originating first or second source, wherein a configuration of each of the first and second pairs of codeword sequences indicates the source of the first or second synchronization signal and a forwarding layer related to the number of nodes for the first or second synchronization signal, and wherein one of three different codeword sequences is placed in each of two symbols in a subframe, such that 9 configurations of pairs of codeword sequences indicate 9 different priorities for synchronization signals;

determine a priority of the first and second synchronization signals based on the configurations of the first and second pairs of codeword sequences; and determine a third pair of codeword sequences from the first and second synchronization signals based on the priority; and a transmitter configured to cooperate with the processor to send a third synchronization signal to another user equipment, wherein the third synchronization signal is carried by the determined third pair of codeword sequences.

4. The user equipment according to claim 3, wherein each of the three different codeword sequences includes a sequence with a length of 63 bits characterized by $$d_u(n) = e^{-j\frac{\pi un(n+1)}{63}} \quad n = 0, 1, \ldots, 30, 31, 32, \ldots, 61, 62,$$

wherein a value of u is 25, 29, or 34 corresponding to the three different codeword sequences.

5. A system comprising a user equipment; a first user equipment; a second user equipment; and, a third user equipment, wherein the user equipment is configured to:

receive a first synchronization signal carried by a first pair of codeword sequences sent by the first user equipment, a second synchronization signal carried by a second pair of codeword sequences sent by the second user equipment, and a third synchronization signal carried by a third pair of codeword sequences sent by the third user equipment, wherein a configuration of the first pair of codeword sequences indicates a first forwarding layer and that a source of the first synchronization signal is a global navigation satellite system (GNSS), wherein a configuration of the second pair of codeword sequences indicates a second forwarding layer and that a source of the second synchronization signal is a network device, wherein a configuration of the third pair of codeword sequences indicates a third forwarding layer and that a source of the third synchronization signal is the third user equipment, and wherein one of three different codeword sequences is placed in each of two symbols in a subframe, such that 9 configurations of pairs of codeword sequences indicate 9 different priorities for synchronization signals; and determine a synchronization signal for the user equipment according to a priority of the synchronization signal based on configuration of the pair of codeword sequences of the synchronization signal.

6. The system according to claim 5, wherein each of the three different codeword sequences includes a sequence with a length of 63 bits characterized by $$d_u(n) = e^{-j\frac{\pi un(n+1)}{63}} \quad n = 0, 1, \ldots, 30, 31, 32, \ldots, 61, 62,$$

wherein a value of u is 25, 29, or 34 corresponding to the three different codeword sequences.

* * * * *

UNITED STATES PATENT AND TRADEMARK OFFICE
CERTIFICATE OF CORRECTION

| | |
|---|---|
| PATENT NO. | : 10,986,598 B2 |
| APPLICATION NO. | : 16/727696 |
| DATED | : April 20, 2021 |
| INVENTOR(S) | : Wang |

It is certified that error appears in the above-identified patent and that said Letters Patent is hereby corrected as shown below:

On the Title Page

Item (71), Applicant: "Huawei Device Co., Ltd., Guangdong (CN)" should read -- Huawei Device Co., Ltd., Dongguan (CN) --.

Signed and Sealed this
Third Day of May, 2022

Katherine Kelly Vidal
Director of the United States Patent and Trademark Office